United States Patent [19]

Hayashi

[11] Patent Number: 5,251,861
[45] Date of Patent: Oct. 12, 1993

[54] COUPLER FIXING STRUCTURE FOR MODULAR WIPER APPARATUS

[75] Inventor: Akira Hayashi, Kiryu, Japan

[73] Assignee: Mitsuba Electric Manufacturing Co., Ltd., Gunma, Japan

[21] Appl. No.: 901,104

[22] Filed: Jun. 19, 1992

[30] Foreign Application Priority Data

Jun. 21, 1991 [JP] Japan .................. 3-55727[U]

[51] Int. Cl.$^5$ .............................................. A47G 1/10
[52] U.S. Cl. ........................... 248/316.5; 15/250.001; 248/74.3
[58] Field of Search ............ 248/74.1, 74.2, 74.3, 248/65, 316.5, 316.7; 15/250.1

[56] References Cited

U.S. PATENT DOCUMENTS

| | | | |
|---|---|---|---|
| 3,954,238 | 5/1976 | Nivet | 248/74.3 X |
| 4,317,262 | 3/1982 | Wells, Jr. | 248/74.3 X |
| 4,669,688 | 6/1987 | Itoh et al. | 248/74.2 |
| 5,063,317 | 11/1991 | Bruhn | 310/91 |
| 5,133,523 | 7/1992 | Daigle et al. | 248/74.2 X |

FOREIGN PATENT DOCUMENTS 2218622 11/1989 United Kingdom .

*Primary Examiner*—Ramon O. Ramirez
*Attorney, Agent, or Firm*—Oliff & Berridge

[57] ABSTRACT

In a modular wiper apparatus having a channel-type frame of a substantially U-shaped cross-section linking together a bracket to which a wiper motor is mounted and another bracket to which a wiper shaft is mounted, a coupler on the side of the wiper motor can be supported by the frame without reducing the strength of the frame. A mounting bracket 12 for mounting and supporting a coupler 10 thereon includes a surrounding portion 12*b* for movable mounting on a frame 7 until the portion 12*b* surrounds a part of the frame, and the location of the frame at which the coupler is to be mounted thereto is formed with engagement projections 7*a* engageable with the surrounding portion so as to restrain the movement of the mounting bracket in the longitudinal direction of the frame.

7 Claims, 6 Drawing Sheets

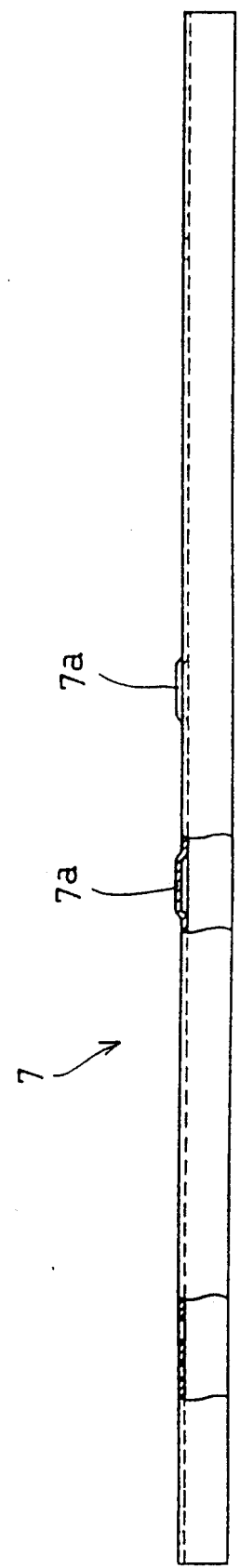

COUPLER FIXING STRUCTURE FOR MODULAR WIPER APPARATUS

BACKGROUND OF THE INVENTION

1. Field of the Invention

The present invention relates to a coupler fixing structure for a modular wiper apparatus which may be installed in a vehicle such as a passenger car, a bus or a truck.

2. Description of the Related Art

A conventional modular wiper apparatus of the above-described type comprises a wiper motor, a link mechanism and wiper shafts, each of these constituents being integrally mounted to a relatively large bracket comprising an aluminum die-casting. Such an apparatus, however, entails the problem that the apparatus is heavy. In order to make the apparatus light and compact, it has been proposed to use a channel-type frame having a substantially U-shaped cross-section to link together a first bracket to which a wiper motor is mounted and a second bracket to which a wiper shaft is mounted.

In an apparatus having such linkage, the wiper motor is supplied with electricity through a circuit provided by coupling a motor-side coupler connected with leads led from the motor with a power-source-side coupler. When the couplers are being coupled with each other the leads may be forcibly extended if this operation is performed with the power-source-side coupler alone being held in place while the motor-side coupler is not held in place. In such case, there is the risk of the leads being broken or their connection with the coupler being damaged. In order to avoid these risks, it is necessary to support and fix in place the motor-side coupler. However, if the position of this fixing is located on the side of the associated driven body, such as the vehicle body, that requirement means that, when the modular wiper apparatus is being assembled onto the driven body, the motor-side coupler must also be supported and fixed in place on the driven body. In such case, therefore, the efficiency of the assembly operation is lowered.

In view of the above point, the motor-side coupler may be supported and fixed in position in the modular wiper apparatus per se. However, if the position of this supporting is located on the first bracket, the motor-side coupler will be located too close to the wiper motor to be uninfluenced by the motor, a heat-generating body. In addition, the motor-side coupler at such a location may interfere with swinging wiper links. Accordingly, it is necessary to provide measures against the above risks. With a view to avoiding the risks, it has been proposed to cause the frame to support the coupler. In a conventional arrangement of this kind, mounting holes are formed in the frame, and engagement projections, provided on the coupler and having pointed ends, are inserted into and engaged with the mounting holes in such a manner as to be prevented from disengagement. With this arrangement, however, since the mounting holes have to be formed in the frame, the strength of the frame itself is reduced. In order to compensate for this reduction, the frame must have a thick wall. This requirement causes other problems. One of them is that the requirement contradicts the original intention of making the wiper apparatus light.

SUMMARY OF THE INVENTION

An object of the present invention is to provide a coupler fixing structure for a modular wiper apparatus that is capable of overcoming all of the above-discussed problems.

According to the present invention, there is provided a coupler fixing structure for a modular wiper apparatus having a first bracket to which a wiper motor is mounted, a second bracket to which a wiper shaft is mounted, and a channel-type frame having a substantially U-shaped cross-section and linking the first and second brackets with each other, the coupler fixing structure allowing a coupler connected with leads led from the wiper motor to be mounted to the frame by a mounting bracket, the coupler fixing structure comprising: a supporting portion of the mounting bracket for mounting and supporting the coupler thereon; a surrounding portion for movably mounting on the frame until the surrounding portion surrounds a part of the frame; and engagement projection means formed on a location of the frame at which the coupler is to be mounted to the frame, the engagement projection means being engageable with the surrounding portion so as to restrain the movement of the mounting bracket in the longitudinal direction of the frame.

The present invention enables, by virtue of the above-specified construction, the coupler to be supported by the frame without reducing the strength of the frame.

BRIEF DESCRIPTION OF THE DRAWINGS

The invention will be described in detail with reference to the following drawings wherein:

FIGS. 6 (A) and 6(B) are a plan view and a partially sectioned front view, respectively, of a frame.

DESCRIPTION OF THE PREFERRED EMBODIMENTS

Figure 1:
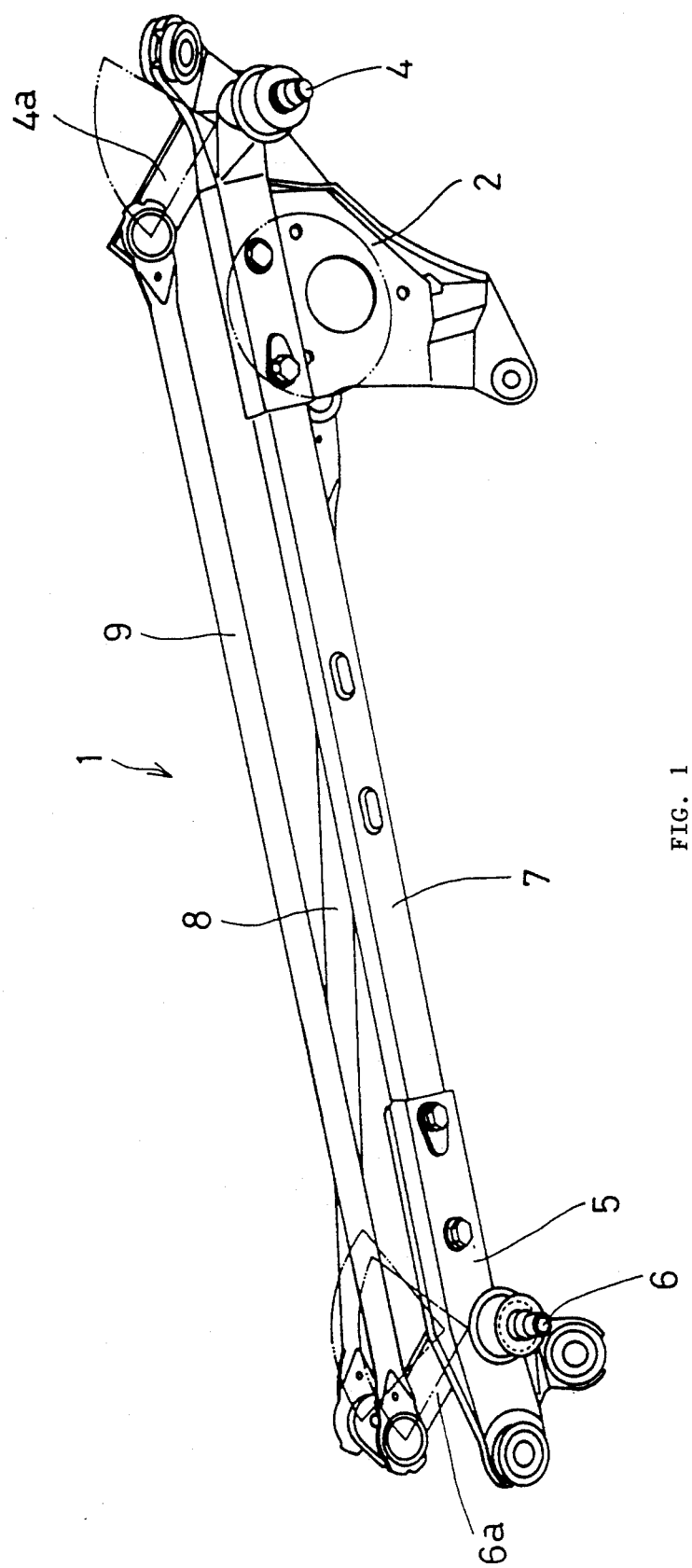
FIG. 1 is a perspective view of a wiper apparatus incorporating a coupler fixing structure according to the present invention, the apparatus being shown in the state where its wiper motor is dismounted.
Figure 2:
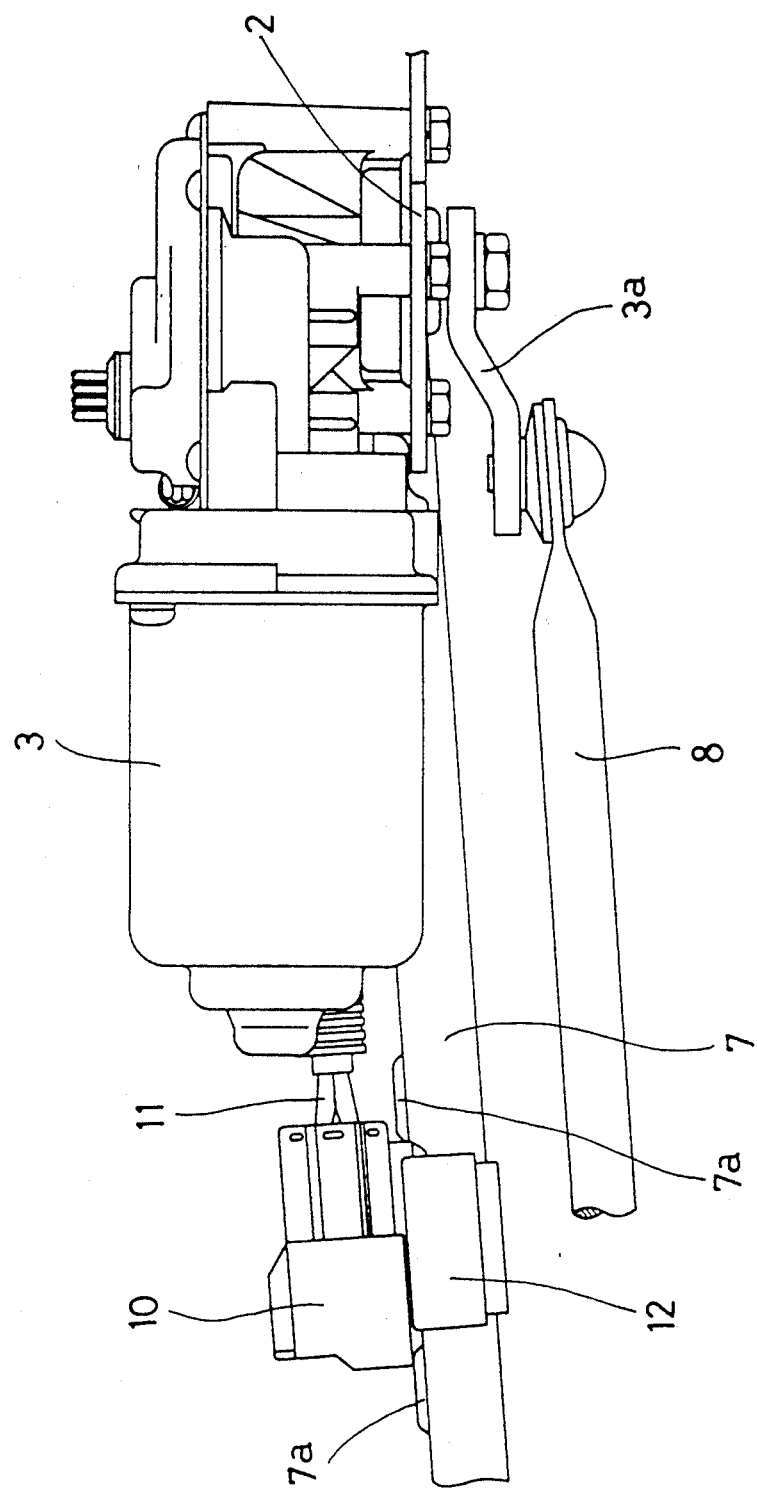
FIG. 2 is a front view of the essential parts of the wiper apparatus.
Figure 3:
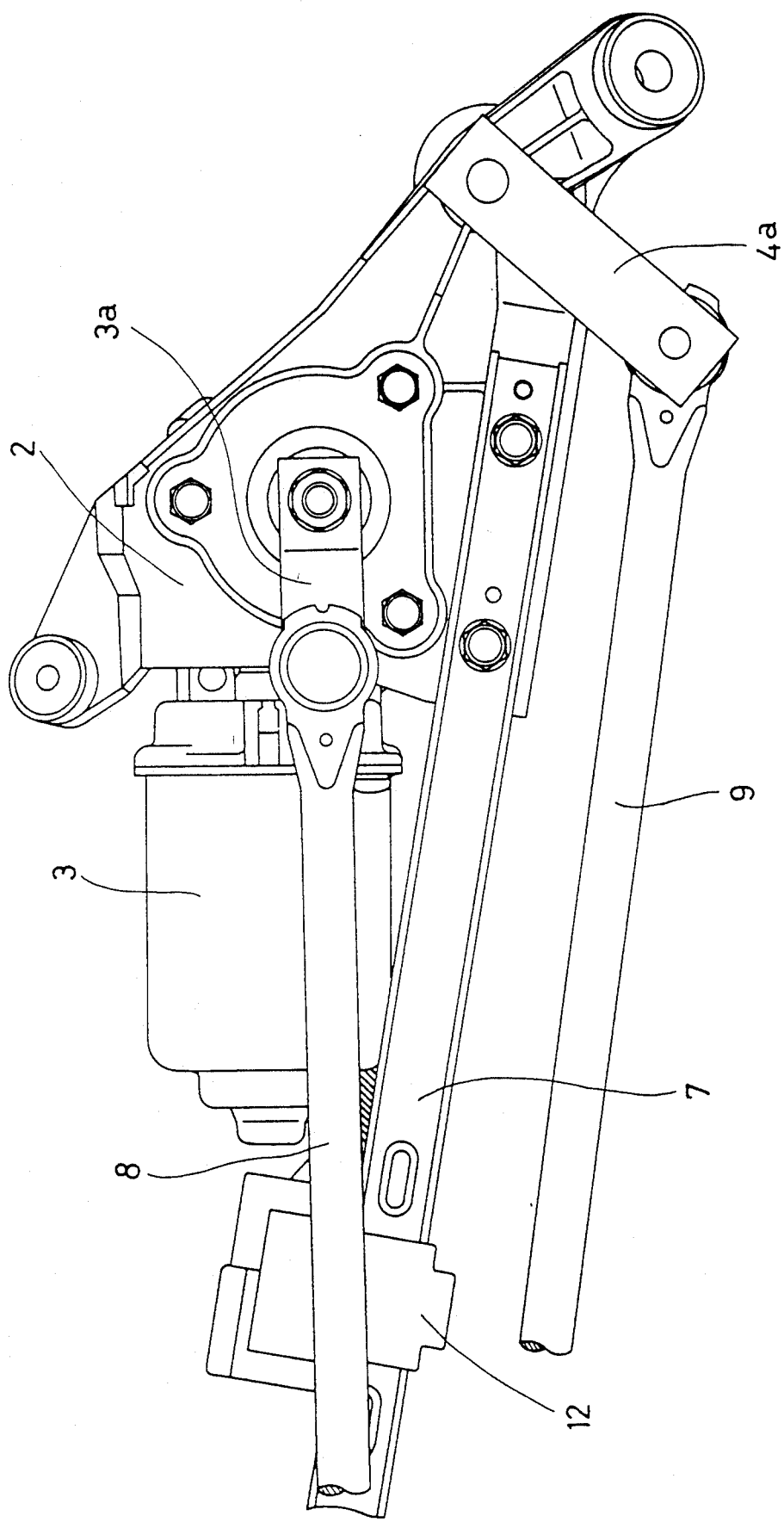
FIG. 3 is a bottom view of the essential parts of the wiper apparatus.

An embodiment of the present invention will be described with reference to the drawings. Referring to FIGS. 1 to 3, reference numeral 1 designates a modular wiper apparatus. A first bracket 2, made of aluminum, is one of the constituents of the wiper apparatus 1 to which a wiper motor 3 and a wiper shaft 4 are mounted. Another wiper shaft 6 is mounted to a second bracket 5 made of aluminum. The first bracket 2 and the second bracket 5 are linked together by a channel-type frame 7 comprising a piece of iron bent into a shape having a substantially U-shaped cross-section. A first wiper link 8 links a motor arm 3a, fixed at one end to a motor shaft of the wiper motor 3, with a link arm 6a provided on the wiper shaft 6 mounted to the second bracket 5. A second wiper link 9 links the link arm 6a with another link arm 4a provided on the wiper shaft 4 mounted to the first bracket 2. When the wiper motor 3 is driven, the link arms 4a and 6a oscillate, causing the wiper shafts 4 and 6 to rotate to perform an operation of wiping on an associated window surface. The above-described construction is substantially the same as that of a conventional apparatus.

A coupler 10 is connected with leads 11 led from the wiper motor 3. The coupler 10 is coupled with another coupler on the side of a power source (neither of which is shown) so as to provide a circuit through which power is supplied from the power source to the wiper motor 3. The coupler 10 is supported by the frame 7 through a mounting bracket 12, described below, in a manner such as to prevent risks such as the risk of the coupler 10 moving inadvertently too close to the wiper motor 3, a heat-generating body, or abut on the swinging wiper links 8 and 9, and the risk of the leads 11 being forcibly extended or broken.

Figure 4:
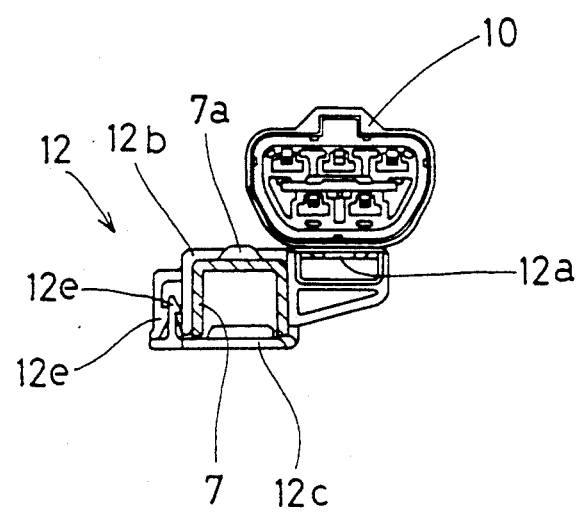
FIG. 4 is a side view of a place of the apparatus where a coupler is mounted.
Figure 5:
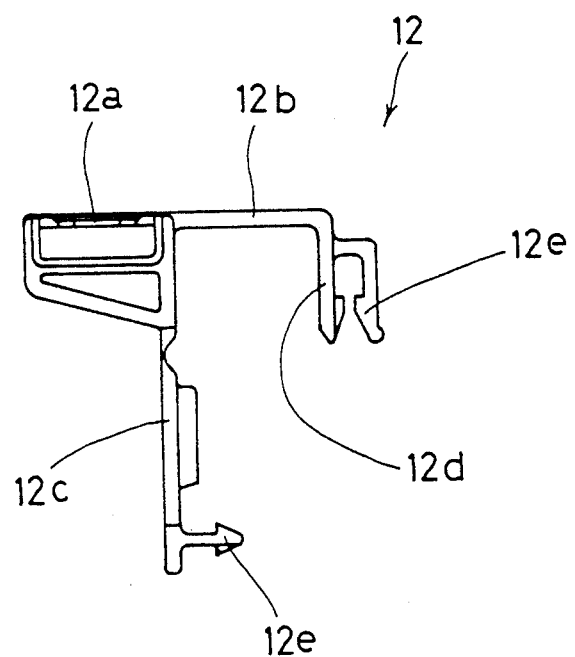
FIG. 5 is a side view of a mounting bracket.

Referring to FIGS. 4 and 5, the mounting bracket 12 includes, on one side thereof, a supporting portion 12a for supporting the coupler 10 in such a manner that the coupler 10 is immovably mounted thereon, and, on the other side, a surrounding portion 12b configured to define a quadrangular prism shaped space and capable of movable mounting on the frame 7, the portion 12b surrounding a part of the frame 7. The surrounding portion 12b is not originally formed having a quadrangular prism shape, but configured such that, after the mounting bracket 12 has been assembled on a part of the frame 7 with one of its walls 12c being open, the wall 12c at the opening is flexibly bent inward, whereupon the surrounding portion 12b assumes a quadrangular prism shape. The wall 12c at the opening and an adjacent wall 12d each have a hook 12e formed thereon, and, when the wall 12c is bent inward, the hooks 12e engage with each other.

As shown in FIGS. 4 and 6, a location of the frame 7 on which the mounting bracket 12 is to be assembled has a pair of engagement projections 7a (together constituting the engagement projection means) for restraining the movement of the mounting bracket 12 relative to the frame 7 in the longitudinal direction thereof, the projections 7a being formed by press forming at two mutually spaced positions, one on each side of the location of the frame 7 where the mounting bracket 12 is to be assembled. The engagement projections 7a are engageable with edges at either end of the surrounding portion 12b so as to restrain the movement of the mounting bracket 12.

In the embodiment having the above-described construction, the coupler 10, connected with the leads 11 led from the wiper motor 3, is supported by the frame 7 linking together the first and second brackets 2 and 5. In order to support the coupler 10 in this way, the mounting bracket 12, on which the coupler 10 is immovably mounted, is assembled onto a location between the pair of engagement projections 7a formed on the frame 7. During this assembly, the mounting bracket 12 is mounted on the frame 7 by the surrounding portion 12b in such a manner as to be movable relative to the frame 7 in the longitudinal direction thereof until such relative movement is prohibited by the projections 7a of the frame 7 engaging with the end edges of the surrounding portion 12b of the mounting bracket 12. When the coupler 10 is thus mounted to the frame 7, it is firmly supported by and mounted to the frame 7 while being prevented from excessive movement in the longitudinal direction of the frame 7.

Thus, according to the present invention, since the coupler 10 is supported by the frame 7 in the above-described manner, it is possible to positively prevent the coupler 10 from being positioned close to the wiper motor 3, which is a heat-generating body, or to the wiper links 8 and 9, which are swingable members. Since movement of the coupler 10 is prevented by engagement projections 7a formed on the frame 7, it is possible to avoid a reduction in the strength of the frame which has been caused in the conventional practice by forming engagement holes in the frame. This in turn makes it possible to reduce the wall thickness of the frame 7, thereby enabling a great reduction in the weight of the apparatus.

In the illustrated embodiment, the pair of engagement projections 7a are formed at two symmetrical positions on the frame 7 with respect to the longitudinal center thereof. This is advantageous in that, when the first and second brackets 2 and 5 are being linked together by the frame 7, the frame 7 can be applied in a position of having either of its ends corresponding to one of these brackets 2 and 5.

With the above-described construction of the present invention, the motor-side coupler is supported by the frame linking together the first and second brackets in such a manner as to separate as much as possible the coupler from the motor, a heat-generating body, and the swinging links. A structure allowing the coupler to be supported by the frame in this manner includes a surrounding portion of a coupler mounting bracket. The surrounding portion is mountable on the frame in such a manner as to be movable relative thereto in the longitudinal direction thereof until such movement is prohibited by engagement projections formed on a certain location on the frame. Consequently, the coupler is prevented from inadvertently moving in the longitudinal direction of the frame.

The prevention of movement of the coupler on the frame is achieved by the engagement projections formed on the frame, and this is advantageous in that, in contrast with the conventional arrangement where engagement holes are formed in the frame, the strength of the frame is not reduced. This makes it possible to reduce the wall thickness of the frame, thereby enabling a great reduction in the weight of the apparatus.

I claim:

1. A coupler fixing structure in combination with modular wiper apparatus having a first bracket to which a wiper motor is mounted, a second bracket to which a wiper shaft is mounted, and a channel-type frame having a substantially U-shaped cross-section and linking said first and second brackets with each other, said coupler fixing structure allowing a coupler connected with leads led from said wiper motor to be mounted to said frame, said coupler fixing structure comprising:

a mounting bracket including a supporting portion and a surrounding portion, said supporting portion being provided for supporting said coupler thereon, said surrounding portion being slidably fixed to said frame; and engagement projection means formed on said frame at a location at which said mounting bracket is to be mounted to said frame, said engagement projection means being engageable with said surrounding portion so as to restrain movement of said mounting bracket along the longitudinal axis of said frame.

2. The coupler fixing structure of claim 1, wherein said frame has a length and said engagement projection means are symmetrically spaced about a center of said length on said frame.

3. The coupler fixing structure of claim 1, wherein said mounting bracket has a predetermined length and said engagement projection means comprise two projections, said projections being spaced from each other a distance substantially equal to said length of said mounting bracket.

4. The coupler fixing structure of claim 1, wherein said engagement projection means are stamped in said frame.

5. The coupler fixing structure of claim 1, wherein said surrounding portion comprises a pivotal member pivotal at one end thereof and having a locking element on a second end thereof, said pivotal member capable of lockably enclosing a quadrangular interior of said mounting bracket in a closed position and exposing said quadrangular interior of said mounting bracket in an open position.

6. The coupler fixing structure of claim 5, wherein said surrounding portion comprises a U-shaped section having two ends, one of said two ends having a locking member and the other of said two ends having a pivotal element pivotally attached at one end thereto, said pivotal element having a locking member at a second end thereof which is matable with the locking member of said U-shaped section of said supporting portion, said pivotal element being pivotal between an open position away from said locking member of said U-shaped section and a closed position in which said locking member of said pivotal element is fixedly mated with said locking element of said U-shaped section.

7. The coupler fixing structure of claim 6, wherein said locking member of said U-shaped section comprises a pair of spaced hooks and said locking member of said pivotal element comprises a hook.

* * * * *